(12) United States Patent
Skomra

(10) Patent No.: US 7,945,675 B2
(45) Date of Patent: May 17, 2011

(54) SYSTEM AND METHOD FOR DELEGATION OF DATA PROCESSING TASKS BASED ON DEVICE PHYSICAL ATTRIBUTES AND SPATIAL BEHAVIOR

(75) Inventor: Stewart A. Skomra, Poway, CA (US)

(73) Assignee: Apacheta Corporation, San Francisco, CA (US)

( * ) Notice: Subject to any disclaimer, the term of this patent is extended or adjusted under 35 U.S.C. 154(b) by 866 days.

(21) Appl. No.: 10/947,566

(22) Filed: Sep. 22, 2004

(65) Prior Publication Data

US 2005/0114448 A1 May 26, 2005

Related U.S. Application Data

(60) Provisional application No. 60/517,114, filed on Nov. 3, 2003, provisional application No. 60/579,379, filed on Jun. 12, 2004.

(51) Int. Cl.
*G06F 15/16* (2006.01)
*H04L 12/28* (2006.01)

(52) U.S. Cl. ........ 709/227; 709/204; 709/205; 709/206; 709/207; 370/431

(58) Field of Classification Search .......... 709/204, 709/205, 206, 207, 227
See application file for complete search history.

(56) References Cited

U.S. PATENT DOCUMENTS

| | | | | |
|---|---|---|---|---|
| 5,421,012 A | * | 5/1995 | Khoyi et al. | 718/107 |
| 6,148,383 A | * | 11/2000 | Micka et al. | 711/162 |
| 6,334,151 B1 | * | 12/2001 | Bolam et al. | 709/225 |
| 6,571,221 B1 | | 5/2003 | Stewart et al. | |
| 7,117,264 B2 | * | 10/2006 | Becker et al. | 709/227 |
| 2003/0009570 A1 | * | 1/2003 | Moskowitz et al. | 709/229 |
| 2003/0039234 A1 | | 2/2003 | Sharma et al. | |
| 2003/0163739 A1 | | 8/2003 | Armington et al. | |

(Continued)

OTHER PUBLICATIONS

GlobalSign NV, "GlobalSign Certification Practice Statement," version 4.3, available at http://www.globalsign.net/repository/GlobalSign_CPS_v_4_3.pdf, pp. 35-38, Oct. 10, 2003.

(Continued)

*Primary Examiner* — William C Vaughn, Jr.
*Assistant Examiner* — Umar Cheema
(74) *Attorney, Agent, or Firm* — Squire, Sanders & Dempsey (US) LLP

(57) ABSTRACT

A method of a peer computing system for performing a data processing service for a remote peer computing system publishes a description of each of a plurality of data processing services which the peer computing system makes available to the remote peer system. The peer computing further publishes a description of at least one of the physical attributes of the peer computing system and the spatial behavior of the peer computing system. The spatial behavior is represented by at least one of a record of the location of the peer computing system with respect to time and a record of networks to which the peer computing system is coupled with respect to time. The peer computing system may receive a service request from the remote peer computing system, the service request may comprise one of: i) a request to perform one of the plurality of data processing services; and ii) a request to perform a new data processing service which utilized the physical and spatial attributes of the peer computing system in conjunction with instructions on how to perform the new data processing.

11 Claims, 13 Drawing Sheets

U.S. PATENT DOCUMENTS

| | | |
|---|---|---|
| 2003/0172272 A1 | 9/2003 | Ehlers et al. |
| 2003/0172280 A1 | 9/2003 | Scheidt et al. |
| 2004/0083263 A1* | 4/2004 | Richardson et al. .......... 709/204 |
| 2005/0027696 A1* | 2/2005 | Swaminathan et al. .......... 707/3 |
| 2005/0076198 A1 | 4/2005 | Skomra et al. |

OTHER PUBLICATIONS

GlobalSign NV, Digital Signature FAQ's, located at http://support.globalsign.net/en/general/faqsg_body.htm, 3 pages, 2000.

GlobalSign NV, Digital Certificate FAQ's, located at http://support.globalsign.net/en/general/faqct_body.htm, 3 pages, 2000.

Howstuffworks.com, "How do Digital Signatures Work?", located at http://computer.howstuffworks.com/question571.htm, 2 pages, available at least by Oct. 13, 2003.

Bill Bryant, Massachusetts Institute of Technology, "Designing an Authentication System: A Dialogue in Four Scenes," located at http://web.mit.edu/kerberos/www/dialogue.html, 17 pages, 1988.

Qualcomm International, "Brew and J2ME: A Complete Wireless Solution for Operators Committed to Java," white paper, 9 pages, 2003.

Eric Sink, "Beyond CheckOut and CheckIn," located at http://software_ericsink.com/Beyond_CheckOut_and_CheckIn.html, 4 pages, Jun. 26, 2003.

Apacheta Corporation, "TransportACE: Automating Pick up and Delivery," located at http://www.apacheta.com/product2.htm, 2 pages, 2004.

Apacheta Corporation, "RouteACE: A New Approach to Route Accounting," located at http://www.apacheta.com/productRACE.htm, 2 pages, 2004.

Workflow Management Coalition, "Workflow Process Definition Interface—XML Process Definition Language," Document No. WFMC-TC-1025, version 1.0, 87 pages, Oct. 25, 2002.

* cited by examiner

| Services Cache 43 | | |
|---|---|---|
| Service 104 | Service Provider ID 105 | QOS Indication 109 |
| | | Available |
| | | Unavailable |
| | | EST 17:00 |
| | | |

196

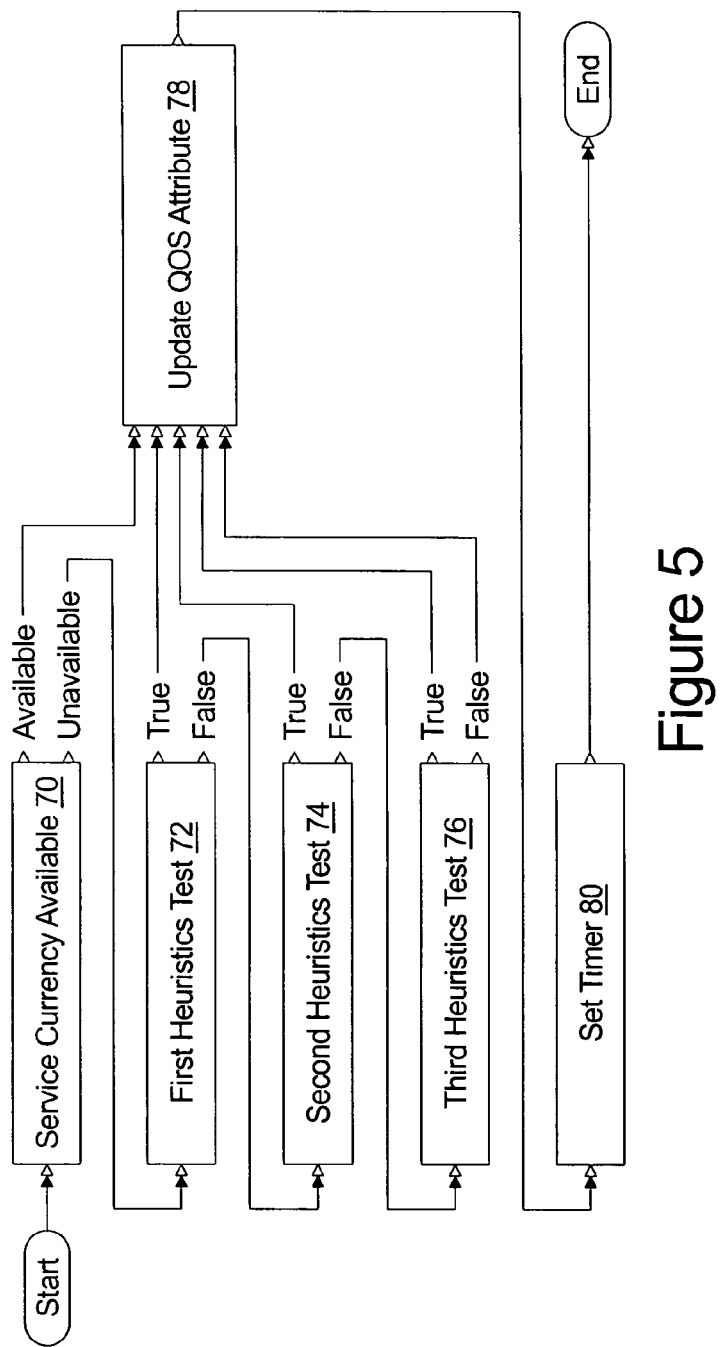

| Task ID 81 | Task Name 82 | Resource 83 | | Variable 88 | | Outcome 91 | |
| --- | --- | --- | --- | --- | --- | --- | --- |
| | | Task 87 | | Global Map ID 90 | | Result 92 | Next Task 93 |
| 4 | Populate Customer List 84f | CustomerDAO.dll Read Customer List | | Local Customer List 1 | | Error | Stop |
| | | | | | | Continue | 9 |
| 9 | Select Customer 84e | Customerforms.dll Customer List Form | | Local Customer List 1 | | Exit | Stop |
| | | | | Local Selected Customer 2 | | Continue | 20 |
| 20 | Read Customer Invoice 84c | InvoiceDAO.dll Read Customer Invoice | | Local Selected Customer 2 | | Error | Stop |
| | | | | Local Customer Invoice 3 | | Continue | 25 |
| 25 | Show Customer Products 84a | Invoiceforms.dll Customer Product List Form | | Local Customer Invoice 3 | | Delivery Complete | 32 |
| | | | | Local Selected Customer 2 | | | |
| 32 | Delivery Verification 84b | Invoiceforms.dll Signature Capture Form | | Local Customer Invoice 3 | | Continue | 37 |
| | | | | Local Signature 4 | | | |
| 37 | Send Customer Signature 84d | InvoiceDAO.dll Send Customer Signature | | Local Selected Customer 2 | | Continue | 9 |
| | | | | Local Signature 4 | | | |

Figure 8

```xml
<?xml version="1.0" encoding="utf-8"?>
<Method StartTask="4" Created="2003-11-03T13:41:00" Updated="2003-11-03T13:58:19">
  <Variables>
    <Variable ID="1" Name="CustomerList" Type="DataSet" Description="" Access="Private" />
    <Variable ID="2" Name="SelectedCustomer" Type="Customer" Description="" Access="Private" />
    <Variable ID="3" Name="CustomerInvoice" Type="CustomerInvoice" Description="" Access="Private" />
    <Variable ID="4" Name="CustomerSignature" Type="CustomerSignature" Description="" Access="Private" />
  </Variables>
  <Tasks>
    <Task ID="4" Name="Populate Customer List" Type="1" Resource="CustomerDAO.dll"
     Method="CustomerDAO.ReadCustomerList" Description="">
      <TVariables>
        <TVariable LocalMap="1" Name="LocalCustomerList" Type="DataSet" GlobalMap="1" Description=""
         ReadOnly="F" Trace="0" />
      </TVariables>
      <Outcomes>
        <Outcome TaskTo="-1" Name="Error" />
        <Outcome TaskTo="9" Name="Continue" />
      </Outcomes>
    </Task>
    <Task ID="9" Name="Select Customer" Type="0" Resource="CustomerForms.dll"
     Method="CustomerForms.CustomerListForm" Description="">
      <TVariables>
        <TVariable LocalMap="1" Name="LocalCustomerList" Type="DataSet" GlobalMap="1" Description=""
         ReadOnly="T" Trace="0" />
        <TVariable LocalMap="2" Name="LocalSelectedCustomer" Type="Customer" GlobalMap="2"
         Description="" ReadOnly="" Trace="0" />
      </TVariables>
```

Figure 9a

```xml
<Outcomes>
    <Outcome TaskTo="20" Name="Continue" />
    <Outcome TaskTo="-1" Name="Exit" />
</Outcomes>
</Task>
<Task ID="20" Name="Read Customer Invoice" Type="1" Resource="InvoiceDOA.dll" Method="InvoiceDAO.ReadCustomerInvoice" Description="">
    <TVariables>
        <TVariable LocalMap="1" Name="LocalSelectedCustomer" Type="Customer" GlobalMap="2" Description="" ReadOnly="T" Trace="0" />
        <TVariable LocalMap="2" Name="LocalCustomerInvoice" Type="CustomerInvoice" GlobalMap="3" Description="" ReadOnly="F" Trace="0" />
    </TVariables>
    <Outcomes>
        <Outcome TaskTo="-1" Name="Error" />
        <Outcome TaskTo="25" Name="Continue" />
    </Outcomes>
</Task>
<Task ID="25" Name="Show Customer Products" Type="0" Resource="InvoiceForms.dll" Method="InvoiceForms.CustomerProductListForm" Description="">
    <TVariables>
        <TVariable LocalMap="1" Name="LocalCustomerInvoice" Type="CustomerInvoice" GlobalMap="3" Description="" ReadOnly="T" Trace="0" />
    </TVariables>
    <Outcomes>
        <Outcome TaskTo="32" Name="DeliveryComplete" />
    </Outcomes>
</Task>
<Task ID="32" Name="Delivery Verification" Type="0" Resource="InvoiceForms.dll" Method="InvoiceForms.InvoiceSignatureCaptureForm" Description="">
```

Figure 9b

```xml
<TVariables>
  <TVariable LocalMap="1" Name="LocalSelectedCustomer" Type="Customer" GlobalMap="2"
    Description="" ReadOnly="T" Trace="0" />
  <TVariable LocalMap="2" Name="LocalCustomerInvoice" Type="CustomerInvoice" GlobalMap="3"
    Description="" ReadOnly="1" Trace="0" />
  <TVariable LocalMap="3" Name="LocalSignature" Type="CustomerSignature" GlobalMap="4"
    Description="" ReadOnly="F" Trace="0" />
</TVariables>
<Outcomes>
  <Outcome TaskTo="37" Name="Continue" />
</Outcomes>
</Task>
<Task ID="37" Name="Send Customer Signature" Type="1" Resource="InvoiceDAO.dll"
  Method="InvoiceDAO.SendCustomerSignature" Description="">
<TVariables>
  <TVariable LocalMap="1" Name="LocalSelectedCustomer" Type="Customer" GlobalMap="2"
    Description="" ReadOnly="T" Trace="0" />
  <TVariable LocalMap="2" Name="LocalSignature" Type="CustomerSignature" GlobalMap="4"
    Description="" ReadOnly="T" Trace="0" />
</TVariables>
<Outcomes>
  <Outcome TaskTo="9" Name="Continue" />
</Outcomes>
</Task>
</Tasks>
</Method>
```

Figure 9c

Services Document 150 (WSDL Document)
   Document Oriented Service Description 152

Proceedure Oriented Service Description 154
      Secondary BP Data Reception Service 65
      Secondary BP Data Provisioning Service 69

Figure 13

Physical Attributes Document 160
   Communication Systems
      LAN
      WAN
   GPS Capabilities
   I/O Peripherals

Figure 14

Spatial Behavior Document 170
   Heuristics Database 46

Figure 15

SYSTEM AND METHOD FOR DELEGATION OF DATA PROCESSING TASKS BASED ON DEVICE PHYSICAL ATTRIBUTES AND SPATIAL BEHAVIOR

TECHNICAL FIELD

The present invention relates to a system for delegating data processing tasks between peer devices and, more particularly to a system and method for delegating data processing tasks based on physical attributes of a device and the spatial behavior of the device.

BACKGROUND OF THE INVENTION

Data networks have existed for many years. A data network comprises a plurality of interconnected computing systems which are often referred to as nodes. The computing devices may be personal computers, servers, printers, or other systems capable of communicating with other nodes utilizing the communication protocols of the data network.

Early networks were typically used for file sharing and printer sharing amongst systems which operated proprietary systems. All systems were typically under the control of the same entity, and within a limited geographic locations. The Internet Protocol (IP) and related protocols such as the File Transfer Protocol (FTP), Hypertext Transport Protocol (HTTP), and other related IP networking protocols have revolutionized the use of data networks and enabled the transfer of data transactions across multiple networks controlled by multiple entities.

Today, assuming appropriate network connectivity and access permissions, an application running on any computer system coupled to an IP network can establish a TCP/IP connection or UDP/IP channel to an application running on any other computer system coupled to an IP network for the exchange information at the application layer.

In theory, an application could request data (or obtain data processing services) necessary for executing its processes from various applications running on any other computer systems coupled to the Internet. However, the problem with the theory is that the information transferred between the applications must be of a type and format recognized by the two applications. Or, stated another way, the data, context, and execution must be compatible with each system at the application level.

To improve the exchange of information between application level systems, independent of application level compatibility, over the Internet, a plethora of systems within the umbrella of web services have been developed. Web services are data processing services offered by a servicing application operating on a first system to other service-requesting applications which can communicate with the first system over the Internet. Typically, the service requesting application sends a Simple Object Access Protocol (SOAP) message, which includes an XML method call, to the servicing application at a specified Universal Resource Locator (URL) using the Hypertext Transport Protocol (HTTP). The servicing system receives the request, performs applicable processing, and returns a response if applicable.

A servicing application may make its web services available to potential requesting applications by publishing an Extensible Markup Language (XML) document that describes the web service and is compliant with the Web Services Description Language (WSDL) protocol. The description of the web service may include the name of the web service, the tasks that it performs, the URL to which the method requests may be sent, and the parameters required in a method request.

There exists at least two problems with traditional web service systems. First, traditional web service systems do not account for mobility of the service provider system. Certain web services, particularly those related to communication of data, can only be performed while the service provider system is communicatively coupled with required network systems. While mobility and varying network connections is not an issue for fixed service provider systems, mobile computing devices which roam amongst multiple local area and wide are wireless networks are continually changing their network connections. The service provider system may be incapable of performing certain services when required network connections are unavailable.

Secondly, the services provided by a web service provider system are limited to only those services performed by applications that have been loaded on the service provider system. Each web services application must be coded, compiled, and loaded on the network device that will perform the service. While these steps may be performed efficiently by use of pre-existing coding objects, efficient compilers, and known methods for distributing software across a network, the fact remains that an executable application capable of performing the web service must be loaded on a service provider device and the availability of the service must be published before remote systems can make a method request to the service. Although a device may have the hardware, lower level software components, and network connections (physical attributes) capable of operating an application for performing a certain web service, a remote device can not make a method call to such device until such time as the application has been loaded and the web service published.

What is needed is an improved network services system that provides for delegating data processing tasks between peer devices and, more particularly a system and method for delegating data processing tasks to a service provider system based on network connectivity behavior of requesting system and the service provider system and based on physical attributes of the service provider system.

SUMMARY OF THE INVENTION

A first aspect of the present invention is to provide a method performed by a peer computing system for performing a data processing service for a second peer computing system.

The method comprises establishing a network connection with a second peer computing system over a network. The peer computing system publishes a description of each of a plurality of data processing services which the peer computing system makes available to the second peer system. The peer computing system further publishes a description of the physical attributes of the peer computing system.

The peer computing system may receive a service request from the second peer computing system, the service request may comprise one of: i) a request to perform one of the plurality of data processing services; and ii) a request to perform a new data processing service which utilized the physical attributes of the peer computing system in conjunction with instructions on how to perform the new data processing.

Upon receipt of the request, the peer computing system performs the requested data processing service.

The step of performing the requested data processing service may comprise reading instructions for performing the data processing service from a non-volatile or volatile storage if the requested data processing service is one of the plurality of data processing services.

The step of performing the requested data processing service, if the requested data processing service is a new service, may comprise: i) receiving new data processing method instructions from the second peer computing system; ii) storing the new data processing instructions in the non volatile or volatile storage as an instruction; and iii) reading the instructions for performing the data processing service from the non-volatile or volatile storage. The new service may then be publishes as a data processing service which may be performed for other remote peer computing systems.

In an exemplary embodiment, at least one of the data processing services is a data processing service that can only be performed by the peer computing system when a remote service is available to the peer computing system. In which case, the published description of such data processing service includes at least one of: i) an indication that the data processing service can be performed; and ii) an estimate of when the data processing service can be performed.

The estimate of when the data processing service can be performed may be based on the spatial behavior of the peer computing system. As such, the method may further comprise recording spatial behavior of the peer computing system and estimating when a remote service will be available to the peer computing system based on comparison of at least one of the current time and the current location of the peer computing system and the spatial behavior of the peer computing system. The spatial behavior may further be published to the remote system or the remote system may, with its knowledge of spatial and time availability of services make the peer computing system aware of such services that the peer computing system may not know of.

The spatial behavior being at least one of: i) a record of the location of the peer computing system with respect to time; ii) a record of remote services available to the peer computing system with respect to time; and iii) a record of remote services available to the peer computing system with respect to location.

BRIEF DESCRIPTION OF THE DRAWINGS

FIG. 5 is a flow chart representing operation of a heuristics module in accordance with one embodiment of the present invention;

FIG. 6 is a table representing a business process data cache in accordance with one embodiment of the present invention;

FIG. 8 is a table of global variable values for performing the local data collection task in accordance with one embodiment of the present invention;

FIGS. 9a-9c represents an exemplary method file for performing the local data collection task in accordance with one embodiment of the present invention;

FIG. 13 is a table representing a services document in accordance with one embodiment of the present invention;

FIG. 14 is a table representing a physical attributes document in accordance with one embodiment of the present invention;

FIG. 15 is a table representing a spatial behavior document in accordance with one embodiment of the present invention.

DETAILED DESCRIPTION OF THE EXEMPLARY EMBODIMENTS

Figure 1:
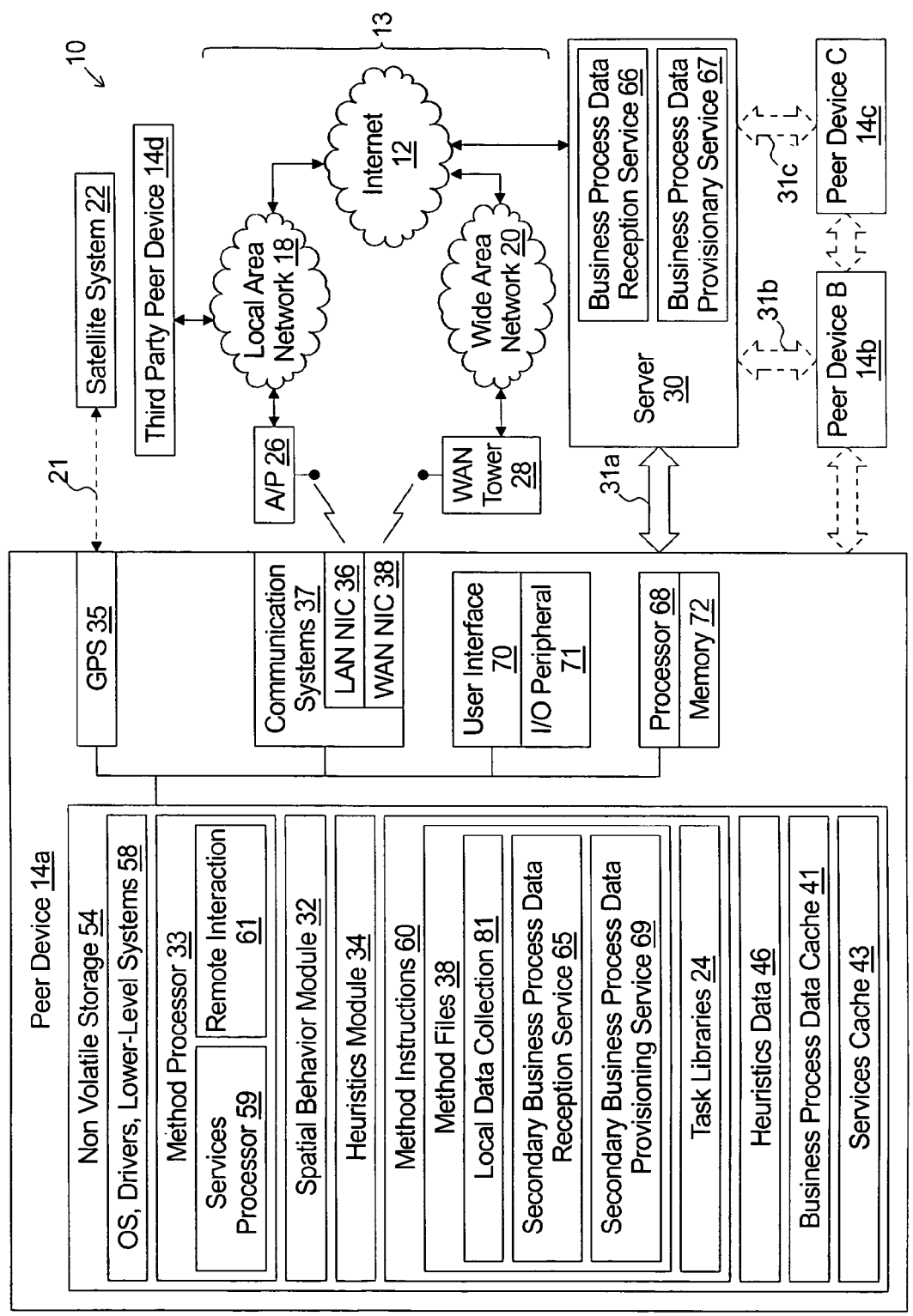
FIG. 1 is a block diagram representing a peer computing system in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

For purposes of illustrating the exemplary embodiments of the invention, certain functions that may be performed by a processor executing software code have been grouped into elements referred to as circuits, modules, or engines. Such grouping of functions is for clarity of the discussion only and those skilled in the art of software design understand that grouping of functions within modular software design is a matter of design choice.

FIG. 1 represents a block diagram of a peer computing system 10 comprising a plurality of peer devices 14a-14d and one or more centralized servers 30. The centralized servers 30 may themselves be peer devices, however, for purposes of describing an exemplary embodiment of the present invention, the server 30 is considered to be stationary and centrally located to the peer devices 14a-14c. The peer devices 14a-14c operate in an open network environment 13 which includes the Internet 12 and may include one or more Internet protocol (IP) wireless local area networks (LANs) 18 and one or more IP wide area networks (WANs) 20.

Each wireless LAN 18 may comprise a plurality of wireless access points 26 for providing wireless network access to those user devices 14 that are within communication range of the access point 26. Each WAN 20 may include at least one wireless tower 28 for providing wireless network access to those user devices 14 within communication range of the wireless tower 28.

For purposes of describing an exemplary embodiment of the present invention, the peer devices 14*a*-14*c* are data collection appliances which collect data related to commercial operations such as the production, movement, sale, and delivery of commercial goods (collectively business process data) at remote locations where the business processes occur. The peer devices 14*a*-14*c* interact with the centralized server 30 for retrieving data related to tasks to be performed by the operators of the peer devices 14*a*-14*c* and uploading locally collected business process data to the centralized server 30. More specifically, for purposes of describing the present invention, the peer devices 14*a*-14*c* may be data collection appliances used to facilitate and record delivery of commercial goods to various remote locations. However, those skilled in the art will appreciate that the teachings of this invention have much broader applicability and the described embodiments are for purposes of illustrating (and not limiting) the present invention.

The centralized server 30 may operate a known database system for recording business process activity. From the perspective of the peer devices 14*a*-14*c*, the centralized server 30 provides a primary business process data reception service 66 and a primary business process data provisioning service 67. Both the business process data reception service 66 and the business process data provisioning service 67 may be web services, the availability of which is published by the server 30 in utilizing known web service description language (WSDL) technology and which may be called utilizing method calls expressed as XML messages and packaged using known standard object access protocol (SOAP) technology.

More specifically, during the course of collecting local business process data, each peer device, for example peer device 14*a*, may make method calls to the primary business process data reception service 66 (which is a document oriented service) for purposes of transferring locally collected business process data to the centralized server 30 and may make method calls to the primary business process data provisioning service 67 (which may be a procedure oriented service) for purposes of obtaining business process data useful for completion of various tasks assigned to the operator of the peer device 14*a*.

Further, each of the peer devices, again using peer device 14*a* as an example, may provide a secondary business process data reception service 65 and a secondary business process data provisioning service 69 to other peer devices 14*b*-14*c*.

The secondary business process data reception service 65 may be a web service, the availability of which is published by the peer device utilizing WSDL and which may be called utilizing XML method calls within SOAP messaging. The secondary business process data reception service 65 accepts a method call in the same manner as the primary business process data reception service 66 would accept a method call and, in response, makes the method call to the primary business process data reception service 66.

Similarly, the secondary business process data provisioning service 69 may also be a web service. The secondary business process data provisioning service 69 accepts a method call in the same manner as the primary business process data provisioning service 67 would accept a method call and, in response, makes the method call to the primary business process data provisioning service 67.

As such, a task of transferring locally collected business process data to the server 30 may be delegated by a peer device (for example peer device 14*b*) to the secondary business process data reception services 65 of another peer device (for example peer device 14*a*) by making a method call to the secondary business process data reception service 65. The secondary business process data reception service 65 then provides for transfer of the locally collected business process data to the primary business process data reception service 66 of the centralized server 30 by making a method call thereto.

Similarly, a task of retrieving, from the centralized server 30, business process data useful for completion of a task assigned to the operator of the peer device 14*b* may be delegated to the secondary business process data provisioning service 69 of peer device 14*a*. Peer device 14*a* then retrieves the business process data from the centralized server 30 and subsequently provides such retrieved business process data to the peer device 14*b*.

In either of the above described examples of delegation, the delegation may be based on current or anticipated peer device 14*a* published service availability to execute a delegated business process or peer device available resources to provide for dynamic instantiation of a service for execution of the delegated business process, for example: i) peer device 14*a* having applicable network connectivity such that peer device 14*a* may provide the services requested by peer device 14*b*; or ii) peer device 14*a* being predicted to have applicable network connectivity (based on the spatial behavior of at least one of peer device 14*a* and peer device 14*b*).

The peer device 14*d* may be a third party peer device coupled to a local area network 18. A peer device, for example peer device 14*a*, may delegate a task of transferring locally collected business process data to the server 30 to the third party peer device 14*d* independent of whether the third party peer device offers a secondary business process data reception service 65 so long as the third party peer device 14*d* has physical attributes (such as network connectivity) sufficient to perform the secondary business process data reception service. To enable such delegation, the third party peer device 14*d* publishes its physical attributes and the peer device 14*a* provides instructions for performing the secondary business process data reception service 65 in conjunction with the delegation.

Similarly, the peer device 14*a* may delegate, to the third party peer device 14*d*, the task of retrieving, from the centralized server 30, business process data useful for completion of a task assigned to the operator of the peer device 14*a*. Again, to enable such delegation, instructions for performing the secondary business process data provisioning service are provided in conjunction with the delegation.

In either situation wherein a task is delegated to a peer device in conjunction with instructions for performing the applicable service, the peer device may then store the instructions in its own internal files and publish the availability of such services to other peer devices.

Although the above described example of the present invention utilizes services related to transfer of data, it is envisioned that each of the peer devices 14 may both provide services and delegate tasks to other peer devices 14 related to any data processing activities including and not limited to: data collection, transformation, communication, storage, and presentation.

Exemplary Peer Device

Each peer device 14 may have similar structure and for purposes of illustrating the peer devices 14, exemplary peer device 14*a* is described herein. The peer device 14*a*, includes a processor 68, memory 72, a non-volatile file storage 54, a user interface 70, at least one I/O peripheral 71, at least one communication peripheral system 37, and a global positioning system (GPS) receiver peripheral 35 interconnected by applicable system busses and peripheral controllers.

The processor 68, memory 72, non-volatile file storage 54, and user interface 70, may be embodied in a known portable computer system such as a tablet computer or a portable data appliance (PDA) wherein the primary user interface comprises a display and an overlaying touch panel.

The I/O peripherals 71 may include such peripherals as a bar code reader, an imaging device, and other peripherals useful for automatically obtaining business process data. Each I/O peripheral 71 may be coupled to the computer system through an applicable peripheral interface and operated under control of applicable drivers for automatically obtaining business process data and transferring such business process data to application level software.

The GPS receiver peripheral 35 may be coupled to the computer system and operated under control of applicable drivers for providing geographic location information to application level software based on detecting global positioning signals 21 provided by a global positioning satellite system 22 such as the one operated by the United States Department of Defense. Determination of location by terrestrial position location systems and/or GPS may be also be accomplished through interfacing with these peripherals through the I/O peripheral 71 interface and/or communications systems 37. Peer device may also infer location determination through delegate position location requests resolved by secondary peer devices equipped with position location peripherals and in peer communications with peer device.

The communication peripherals 37 comprise one or more systems such as a local area network interface circuit 36 or a wide area network interface circuit 38 for establishing a secure connection with the server 30 and/or other peer devices over the network systems 13.

The non-volatile storage 54 may be flash memory or magnetic media such as a rotating hard drive. The non-volatile storage 54 stores executable files such as the operating system, drivers, IP services, and lower level software systems for operating the computer system (collectively referred to as the lower level systems 58). The lower level systems 58 may be known in the art as systems (including virtual machine systems) that in combination with the communication systems 37, the user interface 70, and the other I/O systems 71 provide known communication and processing services to application level software making processing calls thereto.

The non-volatile storage 54 or memory 72 further stores an executable method processor 33, a spatial behavior module 32, and a heuristics module 34. Further, the non-volatile storage 54 store data files comprising method instructions 60, Heuristics Database 46, a business process data cache 41, and a services cache 43.

The spatial behavior module 32 records the spatial behavior (e.g. location, network connections, and/or available services with respect to time) of the peer device 14a in the Heuristics Database 46.

The heuristics module 34 may use the spatial behavior records from the Heuristics Database 46 to: i) determine when the peer device 14 is capable of performing those services that may only be performed if certain network connections (or certain remote data processing services) are available; and/or ii) determine when network connections and/or remote services may become available to the peer device 14. Availability of services is recorded in the Services Cache 43.

The method processor 33 comprises a services processor 59 and a remote interaction module 61. In general, the services processor 59 reads the method instructions 60 to perform local data processing tasks such as local data collection tasks and perform services upon receipt of method calls from remote peers.

The remote interaction module 61, publishes the services made available by the peer 14a, and publishes the physical attributes and spatial behavior of the peer device 14a. This data, when published to a remote peer, enables the remote peer to decide whether to delegate a task to the peer device 14a (and provide instructions on how to perform the task if the delegation is based on the peer's physical attributes and spatial behavior). Similarly, the method processor 33, executing method instructions 60, may receive published physical attributes and spatial behavior of a remote peer and, if applicable, delegate to the remote peer a task in conjunction with providing instructions on how to perform the task.

A more detailed discussion of each of the method processor 33, the spatial behaviors module 32, the heuristics module 34, and the method instructions 60 is included herein.

Heuristics Database

Figure 2:
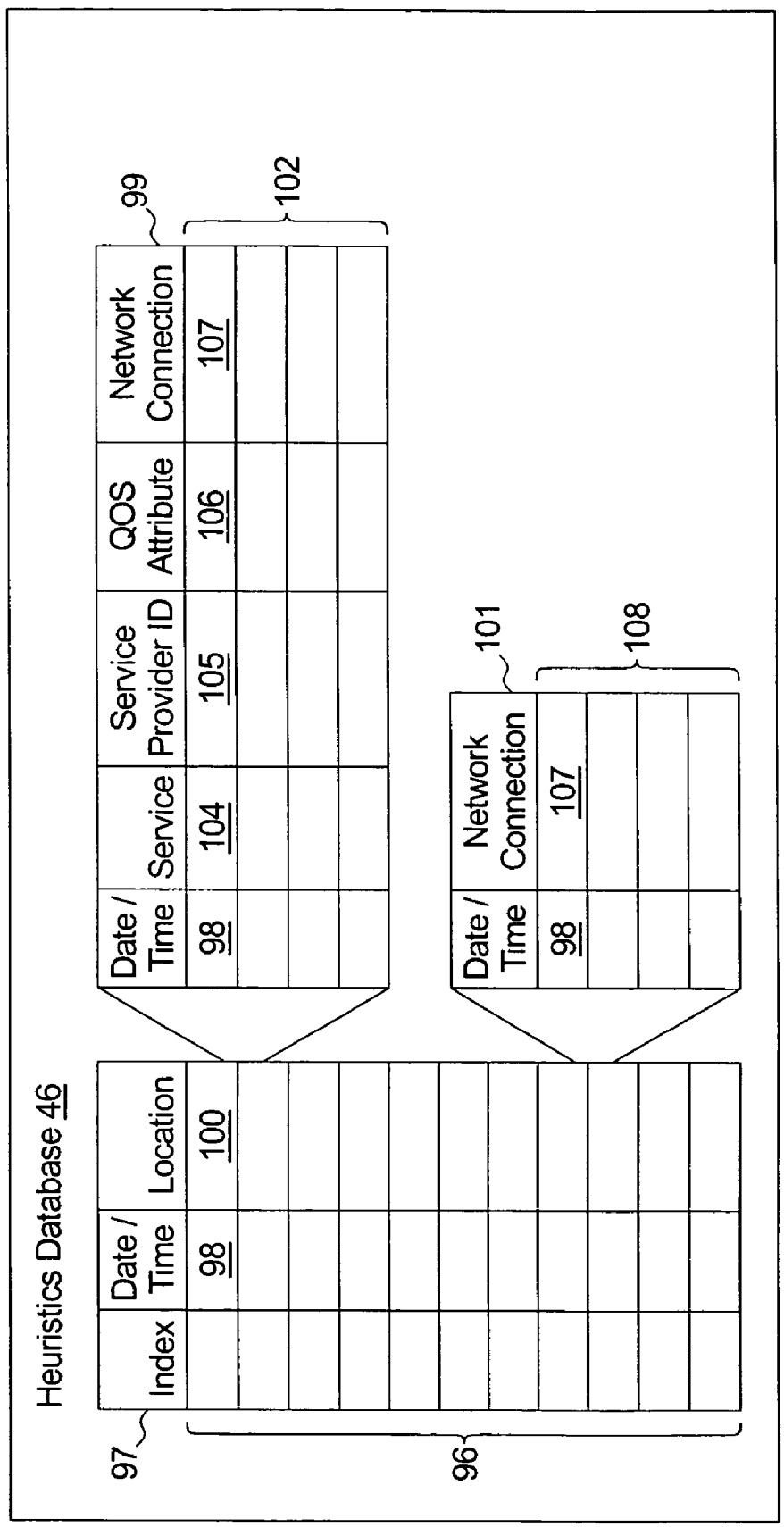
FIG. 2 is a table representing a heuristics database in accordance with one embodiment of the present invention.

Turning briefly to the table of FIG. 2, an exemplary Heuristics Database 46 is shown. The Heuristics Database 46 stores: i) data related to the location of the peer device 14a with respect to time; ii) network connections available to the peer device 14a with respect to time; and iii) services available to peer device 14a with respect to time. More specifically, the database may include a main table 97 with a plurality of records 96. Each record represents a unique date time value 98 (representing an instant in time) and associates with the date time value 98, the location 100 at which the peer device 14a was located at the instant in time.

A services table 99 is keyed off of the main table 97 and includes a plurality of records 102, each of which associates a remote service 104 available to the peer device 14a at each instant in time recorded in the main table 97. The services table 99 further stores, in association with the remote service 104, the service provider ID 105 of the peer device publishing availability of the service 104, a QOS attribute 106 of the service 104, and the network connection 107 through which the service is available.

A network connections table 101 is also keyed off of the main table 97 and includes a plurality of records 108, each of which associates a network connection 107 available to the peer device 14a at each instant in time recorded in the main table 97.

This data structure enables the heuristics module 34 to estimate or predict when a service will be available to the peer device 14a based on: i) the current location of the peer device 14a, the current time, and changes in the location of the peer device 14a with respect to time; and ii) the current network connections available to the peer device 14a, the current time, and changes in the network connections available to the peer device 14a with respect to time.

Spatial Behavior Module

The spatial behavior module 32 records spatial behavior of the peer device 14a within the heuristics data file 46. The spatial behavior of peer device 14a comprises at least one of: i) a record of the location of peer device 14a with respect to time; and ii) a record of remote services available to the peer device 14a with respect to time.

Figures 3, 4:
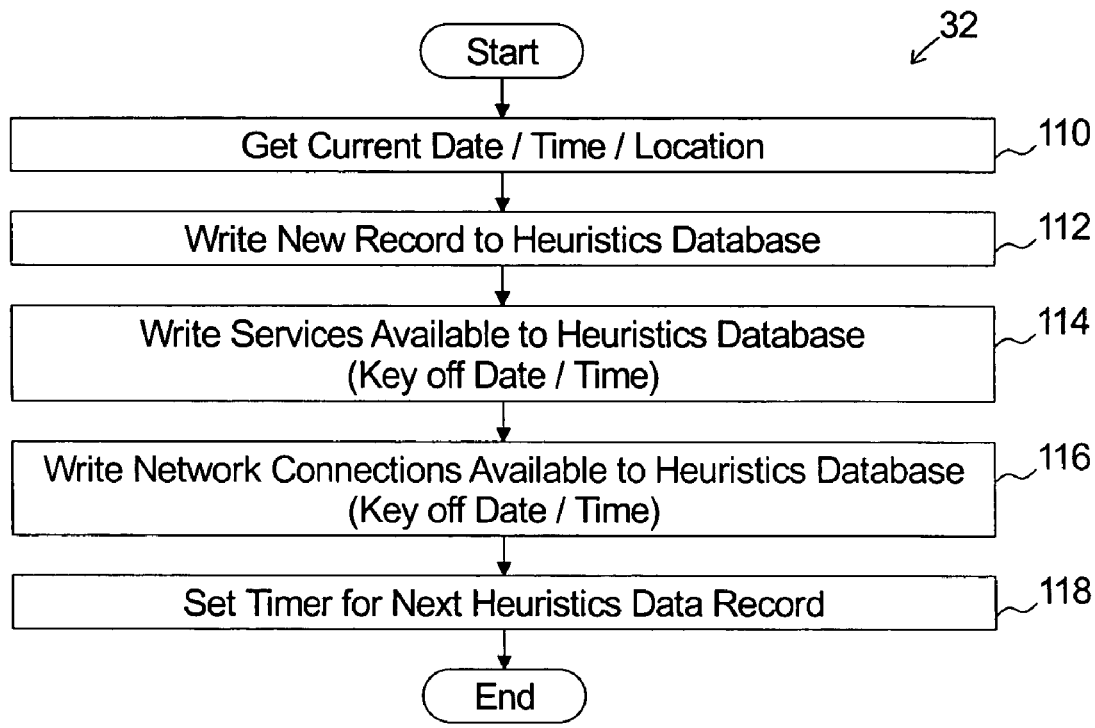
FIG. 3 is a flow chart representing operation of a spatial behavior module in accordance with one embodiment of the present invention.
FIG. 4 is a table representing a services cache in accordance with one embodiment of the present invention.

The flow chart of FIG. 3 represents exemplary operation of the spatial behavior module 32. The spatial behavior module 32 executes at periodic intervals for storing in the heuristics data base 46, in association with the date and time 98, the then current location 100 of the peer device 14a, the services 104 then currently available to the peer device 14a, and the network connections 107 then currently available to the peer device 14a.

The first tasks performed by the spatial behavior module 32 is to obtain the then current date, time, and location of the peer device 14a as represented by step 110. These tasks may be performed by making appropriate method calls to sources of the information such as the drivers for an internal clock (not shown) and the drivers for the GPS module 35. These sources of information may also be inferences drawn from relationships of peer device 14a with secondary peer devices and also from the context of the business processes being executed by peer device 14a through its method processor 33.

After the current date, time, and location or obtained, a new record 96 is written to the main table 97 of the Heuristics Database 46, at step 112, to record the date, time, and location of the peer device 14a.

Step 114 represents writing, to the services table 99, a record 102 representing each service 104 that is then currently available to the peer device 14a as well as the ID of the service provider 106, the QOS attribute 106, and the network connection 107 through which the service is available.

The QOS attribute 106 represents information about the service useful for determining whether use of the service 104 by the peer device 14a would be efficient. For example, the QOS attribute 106 may indicate whether the service provider 105 is capable of executing the service 104 immediately upon receipt of a method call from the peer device 14a, or whether it is predicting that it will be capable of executing the service 104 within a short duration of time (based on its own heuristics records). As another example, the QOS attribute 106 may indicate an overall time estimate or overall cost associated with performing the service 104.

Step 116 represents writing, to the services data base 99, a record 108 representing each network connection 107 that is then currently available to the peer device 14a.

Step 118 represents setting a timer for a time duration representing the periodic interval at which the spatial behavior module 32 writes to the Heuristics Database 46 such that the steps of the flow chart of FIG. 3 are again repeated upon expiration of the timer.

Services Cache

Turning briefly to FIG. 4, the services cache 43 includes a plurality of records 196. Each record 196 represents a service 104, including both services that are locally available (e.g. instructions for performing the service are included in the instructions 60) and services that are available from a remote service provider. Each record 196 comprises a service ID field 104 identifying the service, a service provider ID field 105 identifying the provider of the service, and a QOS indication field 109. In the event that the service 104 is performed locally, the service provider ID 105 will so indicate. The QOS indication field 109 includes: i) an indication that the service is currently available; ii) an indication that the service is not available; and iii) a time frame within which the service is predicted to be available; iv) performance characteristics by time, and v) cost of use of the service.

Heuristics Module

Returning to FIG. 1, the heuristics module 34 extracts data from the Heuristics Database 46 (FIG. 2), predicts when services 104 will be available based on the spatial behavior of the peer device 14a and updates the status of the service 104 in the services cache 43 (FIG. 4).

The flow chart of FIG. 5 represents exemplary operation of the heuristics module 34. Referring to FIG. 5 in conjunction with FIGS. 1 and 4, the heuristics module 43 is periodically run for each service 104 set forth in the services cache 43.

Step 70 represents determining whether the service is currently available. If the service is currently available, the QOS indication 109 is updated (if applicable) to reflect current availability at step 78. Thereafter, a timer is set, at step 80, for a duration of time until the heuristics module 34 is again run for the service.

If the service is not currently available, a plurality of heuristics tests are run to predict future availability of the service. Three exemplary heuristics tests are represented by steps 72, 74, 76, however, those skilled in the art will recognize that other texts are equally useful.

The first exemplary heuristics test, represented by step 72, may be a test such as whether within A hours of the current time on the most recent B of C days, the service was available. If true, it can be predicted that the service will again be available within A hours and the QOS indication 109 is updated to reflect such prediction at step 78.

The second exemplary heuristics test, represented by step 74, may be a test whether within A hours of the current time on the most recent B of C days, was the network required for access to the service available to the client 14. If true, it can be predicted that the service will again be available within A hours and the QOS indication 109 is updated to reflect such prediction at step 78.

The third exemplary heuristics test, represented by step 76, may be a test whether within A hours of the client 14 being within H meters of its current location, the service, or the network required for access to the service, was available to the peer device 14. If true, it can be predicted that the service will again be available within A hours and the QOS indication 109 is updated to reflect such prediction at step 78.

If all heuristics tests are false and it can not otherwise be predicted that the service will be available, the QOS indication 109 is updated to reflect unavailability at step 78.

Business Process Data Cache

The business process data cache 41 stores business process data, including both locally collected business process data and remotely obtained business process data. In the exemplary embodiment, the business process data is stored as XML tagged data content.

The table of FIG. 6 represents exemplary structure of the business process data cache 41. The business process data cache 41 includes a plurality of records 90, each which includes a global variable ID field 92, a global variable name field 94, and a value 96. The global ID field 92 includes a global ID number which is utilized in the method files 38 (FIG. 3) for identifying a global variable. The variable name field 94 identifies the global variable which may be stored locally in data fields 40 or stored on a remote system. This data structure enables application level software to read and write values 96 to the local data storage 56 as well as to identify such values by global variable ID 92 and global variable name 94 to other software modules and peer devices.

As discussed, the business process data cache 41 stores business process data as XML tagged data content. The XML storage of data enables grouping of data utilizing nested XML tags. Nesting enables grouping of data, that is identified by common tags, within higher level nested tags which identify such things as the source of the data, the time sensitivity of the data, and other pertinent parameters regarding the data.

Method Instructions

Returning to FIG. 1, as discussed, the remote interaction module 61 of the method processor 33 publishes services which the peer device makes available to remote peers and publishes the peer devices physical attributes and spatial behavior. The services processor 59 of the method processor 33 reads method instructions 60 from the non-volatile storage 54 to perform data processing tasks related to its own operation and to perform tasks delegated to the peer by remote peer devices.

The method instructions 60 comprise business method files 38 and task libraries 24. The task libraries 24 comprise one or more files which include various tasks. Each task includes code that is either executable or interpretable for performing certain processing steps. Executable code means code compiled for in native machine code for execution by the hardware and operating system of the client peer device 14a. Interpretable code means code written independent of any operating system or hardware system which includes instructions that are interpretable by virtual machine software for execution on the hardware and operating system of the client peer device 14a.

The business method files 38 include files describing the flow order for each of the various tasks which comprise a service. To perform the service, the method processor 33 reads the flow order from the method files and calls each task sequentially.

For example, a method files 38 may be a local business process data collection service 81 which is a method that includes a sequence of tasks associated with operating the user interface 70 and the I/O peripherals 71 for obtaining local business process data, addressing the local business process data to the business process data reception service 66, and storing the local business process data in the business process data cache 41 until such time as a method call may be made to the primary business process data reception service 66 (or a secondary business process data reception service 65).

Figure 7:
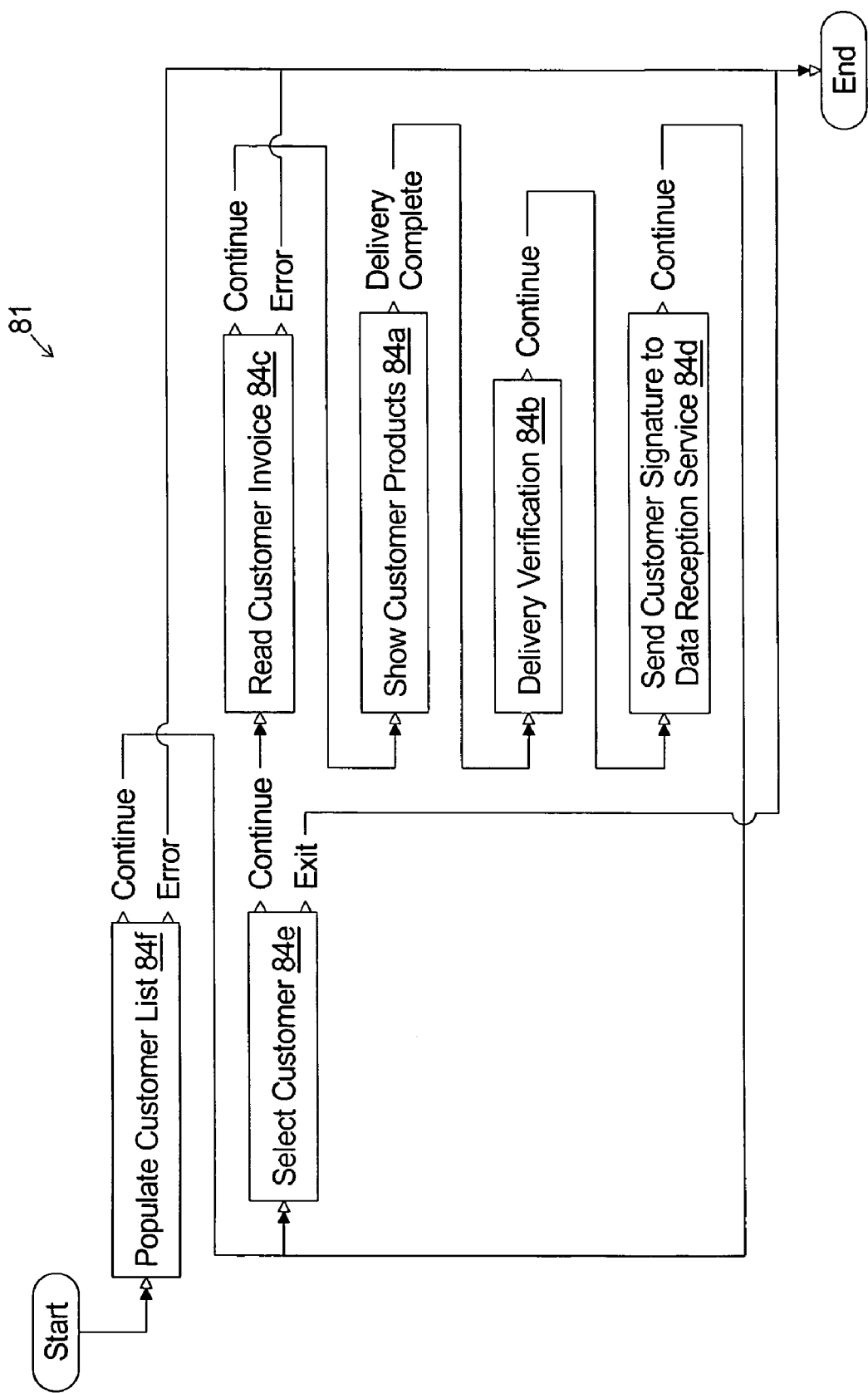
FIG. 7 is a flow diagram representing exemplary operation of a local data collection task in accordance with one embodiment of the present invention.

The flow diagram of FIG. 7 represents the method 38 of such exemplary business process data collection service 81. The method 38 comprises operating six component tasks 84a-84f for recording delivery of products to a customer and obtaining the customers signature for verification of delivery. More specifically, task 84f comprises a task called Populate Customer List which generally relates to displaying a list of customers on the display of the peer device 14. Task 84e, entitled Select Customer, generally relates to obtaining operator selection of a customer from the list. Task 84c, entitled Read Customer Invoice generally relates to obtaining the applicable invoice for the selected customer and task 84a represents showing the customer products on the invoice. Task 84b, entitled Delivery Verification, generally relates to capturing the customers signature by the peer device 84b and task 84d relates to sending the captured signature of the data reception service of the server 30.

The table of FIG. 8 represents an exemplary method file 38 which corresponds to the local business process data collection service. The method file 38 comprises a task ID field 81, a task name field 82, a resource field 83, a task field 87, a variable field 88, a global map ID field 90, and an outcome field 91 comprising a result field 92 and a next task field 93.

The task ID field 70 includes a unique number identifying the task within the method file 38. For example, task ID number "4" associates with the task entitled Populate Customer List 84f. Task ID number "9" associates with the task entitled Select Customer 84e. Task ID number "20" associates with the task entitled Read Customer Invoice" 84c.

The method file 38 associates, with each task, the location wherein the executable or interpretable code for performing the task is located. The location is identified by a resource 83 and a task 87. The resource field 83 identifies a task library file which includes the executable or interpretable code for performing the task and the task field 87 includes the location within the task library file 24 at which the executable or interpretable code is located. For example, the executable or interpretable code for performing task "4" is within the "customerDAO.dll" file located at "readcustomerlist". It should also be appreciated that the location of a task does not need to be stored in the memory 72 or non volatile storage 54 of the client 14a, it is envisioned that the task may be stored on another computing device to provided for distributed processing.

The method file 38 also associates, with each task, the global variables that are read or written by the task. Each variable is identified by its global variable ID number in the global map ID field 90 and assigned a task specific variable name in the variable field 88.

The method file 38 also associates, with each task, an outcome 91 which includes a result field 92 and a next task field 93. The result field 92 stores each possible outcome that the task may produce and the next task field 93 identifies the next task, by task ID number 81, that is to be executed in the event that the outcome is produced.

In an exemplary embodiment, the method file 38 is formatted as an XML file as shown in the flow listings set forth in FIG. 9a through 9c.

Figure 10:
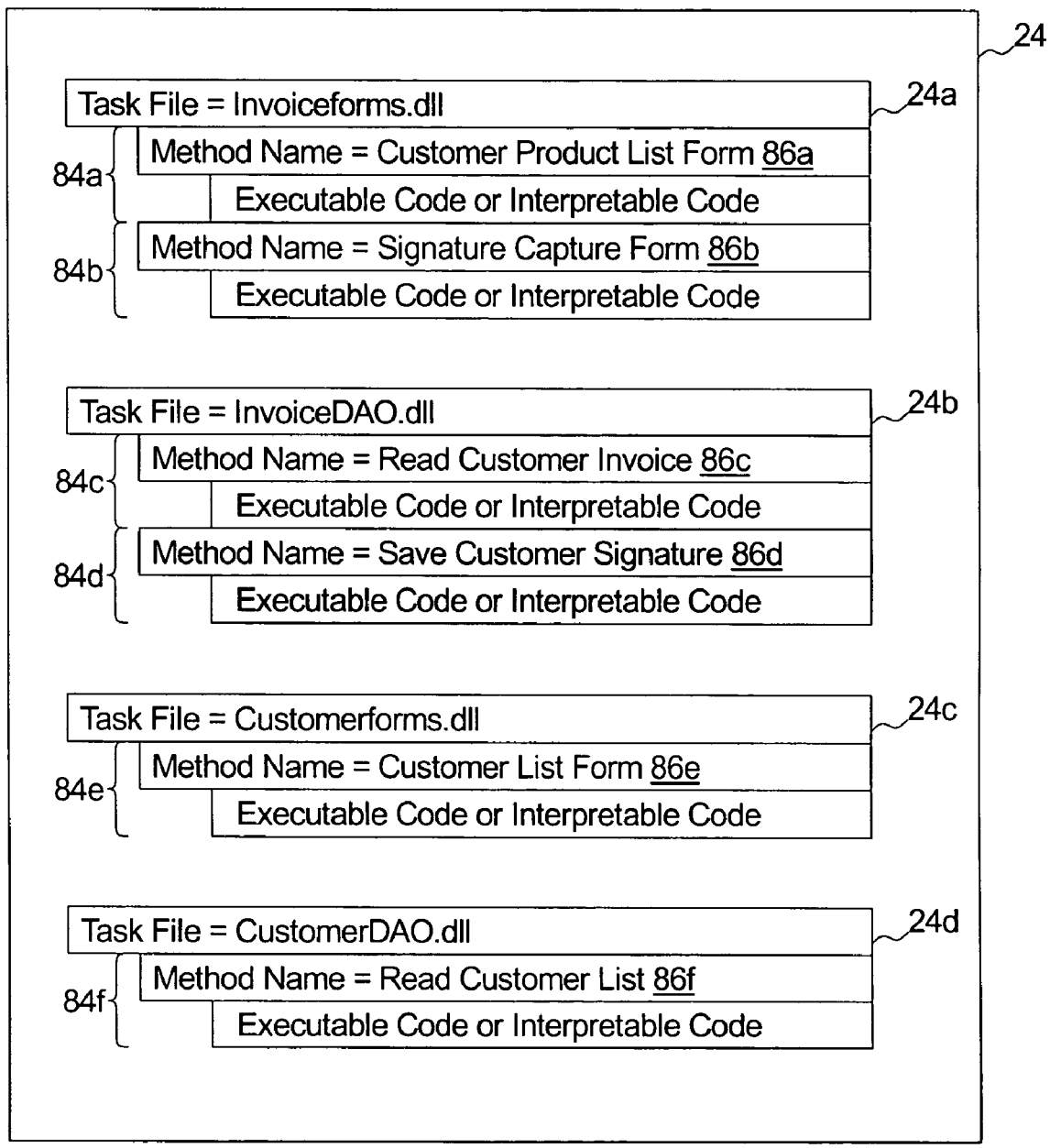
FIG. 10 represents task library storage in accordance with one embodiment of the present invention.

The tables of FIG. 10 represent a portion of the task libraries 24 which include the tasks used for executing the exemplary local business process data collection task 60. Referring to FIG. 10 in conjunction with FIG. 1, the task library 24 comprises task files 24a through 24d, each of which includes various tasks 84a, 84b, 84c, 84d, 84e, and 84f. Each task is identified by a task name 86a, 86b, 86d, 86e, and 86f and includes either executable code or interpretable code for performing certain processes including reading and/or writing of the applicable variables to local data storage and producing output values addressed to a services for storage in the business process data cache 41 and subsequent handling by peer to peer data management methods 62.

Returning to FIG. 1, additional exemplary services within the method files 38 may include the secondary business process data reception service 65, the secondary business process data provisioning service 69, and other services which the peer device 14 performs either as part of its own data processing or as web services for remote peer devices. Each of such other services may be implemented in a similar manner to the local data collection service 81 described with respect to FIGS. 7 through 10.

Services Processor

As discussed, the methods of the method file 38 are operated by the services processor 59. More specifically, the services processor 59 calls each task in accordance with applicable method file 38. The flow chart of FIG. 11 represents exemplary operation of the services processor 59.

Figure 11:
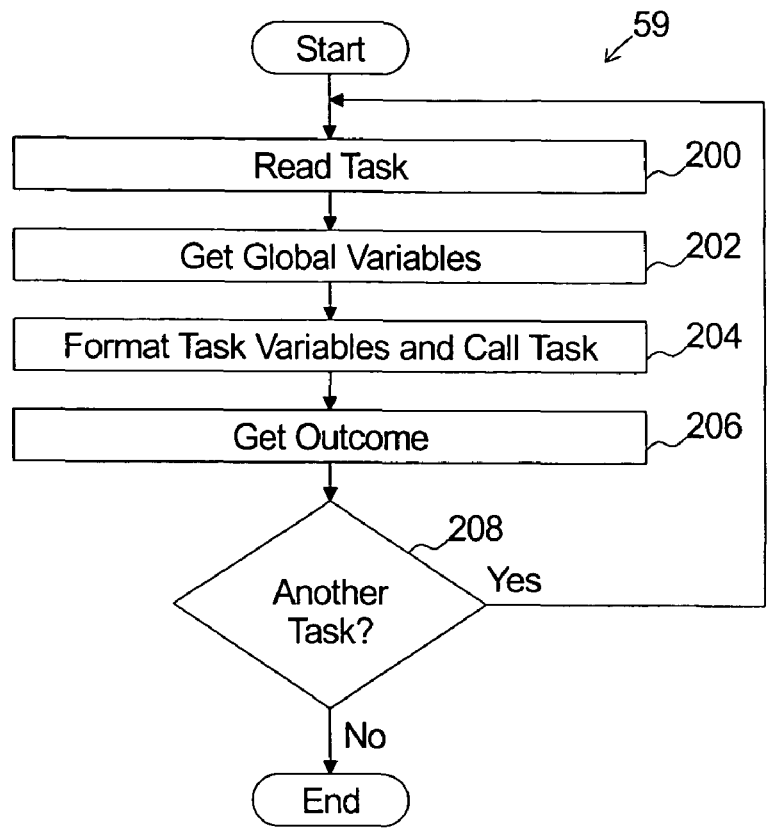
FIG. 11 is a flow chart representing exemplary operation of a services processor in accordance with one embodiment of the present invention.

Referring to FIG. 11 in conjunction with FIG. 1, step 200 represent reading the task from the method file 38. For example, with respect to the exemplary local business process data collection task 81, as represented by FIG. 8, the first task read and from the task file 24 is task "4".

Step 202 represents reading the required global variables for task "4" from the local data storage 56, as identified by the method file 38a of FIG. 7.

Step 204 represents formatting the values obtained at step 202 utilizing the task variable name 82 identified by the method file 38 and calling the task as stored in the task library 24. As discussed, the location of the executable or interpretable code within the task library 24 is identified in the resource field 83 and task field 87 of the method file 38.

Step 206 represents obtaining the outcome from the task. The decision box 208 represents determining if another task is to be executed based on the contents of the next task field 93 which corresponds to the result provided by the task. If another task is to be executed, the method processor 33 return to step 200 where the next task is read.

Although the exemplary method file 38 and task libraries represent an exemplary local business process data collection service 81, the same structure is used to implement the other services set forth in the method files 38.

Remote Peer Interaction Module

As discussed, the remote peer interaction module 61 is responsible for publishing services provided by the peer device 14, the physical attributes of the peer device 14, and the spatial behavior of the peer device 14. The remote peer interaction module 61 is further responsible for receiving method calls for published services from remote peers and receive method calls (in conjunction with instructions) for new services being called by a remote peer based on at least one of the physical attributes and the spatial behavior of the peer device 14.

Figure 12:
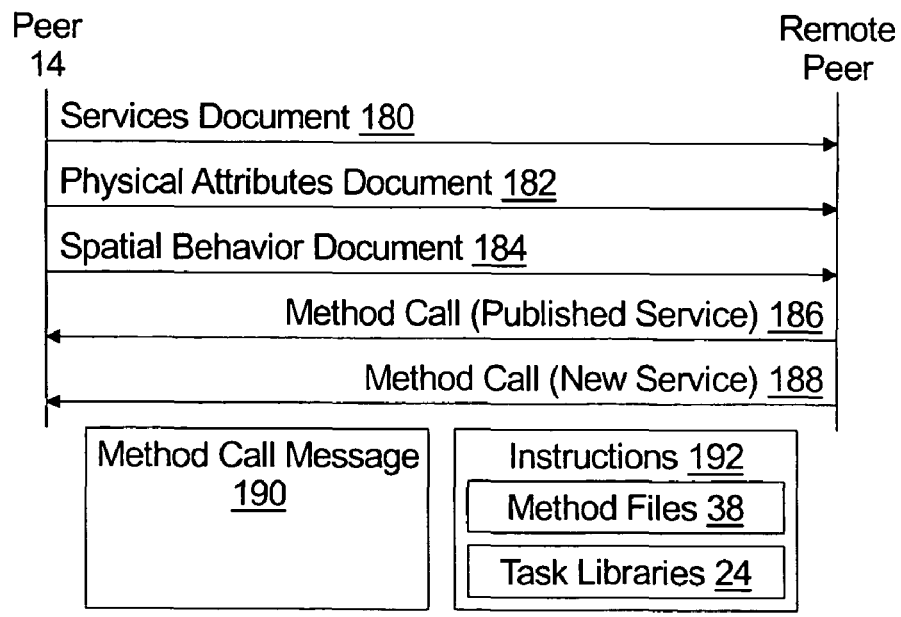
FIG. 12 is a ladder diagram representing operation of one embodiment of the present invention.

The ladder diagram of FIG. 12 represents interaction of the remote peer interaction module 61 with a remote peer. Step 180 represents publishing a services document 150 as shown in FIG. 13. The services document may be a WSDL document which includes a description of each document oriented service 152 and each procedure oriented service 154 made available by the peer device 14. These services will be those services set forth in the services cache 43 and may include the QOS attribute.

Step 182 represents publishing a physical attributes document 160 as shown in FIG. 14. The physical attributes document 160 may be an XML document and comprise such information as the communication systems 37 of the peer device, the abilities of the peer device 14 o determine its physical location based on a GPS system 35, and the IP peripherals 71 of the peer device.

Step 184 represent publishing a spatial behavior document 170 as shown in FIG. 15. The spatial behavior document 170 may be an XML document that includes at least a portion of the spatial behavior data from the Heuristics Database 46.

Although the above description includes publishing each of the services, physical attributes, and spatial behavior as separate documents, those skilled in the art will appreciate that a single document may be used for publishing a combination of the services, physical attributes and spatial behavior of the peer device 14.

Step 186 represents receiving a method call from the remote peer for a published service as is known in the art of web services. Step 188 represents receiving a method call from the remote peer for a new services based on the remote peer determining that the peer device 14 has at least one of physical attributes or spatial behavior that makes the remote peer 14 capable of performing the new service even though the new service is not then currently a published service.

The method call for the new service may include both a method call message 190 which, in the exemplary embodiment is an XML SOAP message and includes instructions 92. The instructions 92 comprise the method files 38 and task libraries 24 needed for performing the new service. Upon receipt, the remote peer interaction module 61 stores the instructions 192 in the services instructions 60 and passes the method call message 190 to the services processor 59.

After writing the instructions 192 to the services instructions 60, the new service can be publishes as an available service in the services document 150 for future use by other remote devices.

Figure 16:
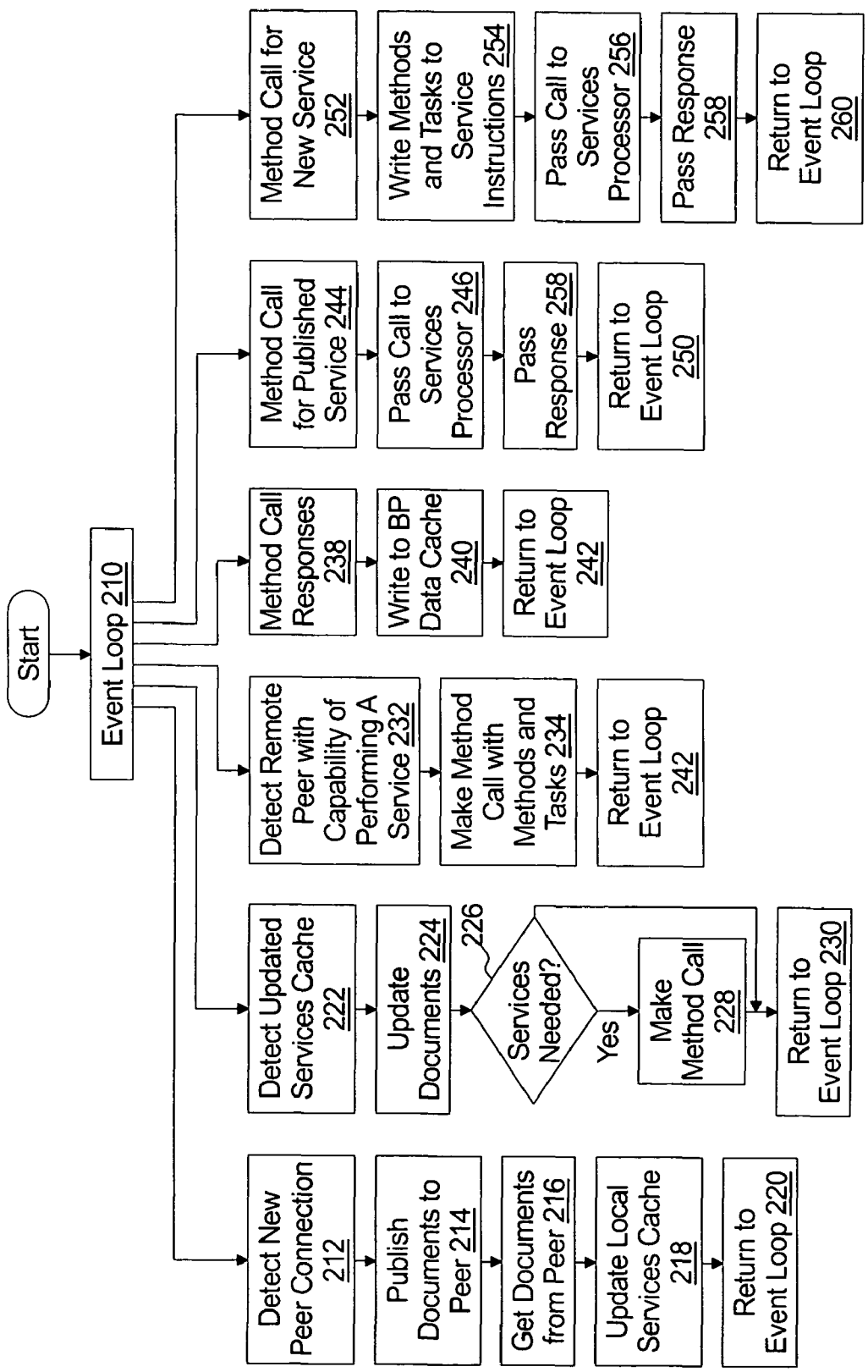
FIG. 16 is a flow diagram representing exemplary operation of a method processor interacting with remote peer devices in accordance with one embodiment of the present invention.

The flow chart of FIG. 16 represents exemplary operation of the remote peer interaction module 61. The remote peer interaction module 61 is an event driven application which performs certain processes in response to detecting certain events. Box 210 represents an event loop wherein the module 61 is waiting for an event.

Upon detecting a new peer connection as represented by box 212, the module 61 publishes each of the services document 150, the physical attributes document 160, and the spatial behavior document 170 to the new peer.

The module 61 further receives at least one of a services document, physical attributes document 160, and spatial behavior document from the new peer as represented by step 216 and updates the services cache 43 in response thereto at step 218. Step 220 represents returning to the event loop.

Upon detecting an update to the services cache 43 as represented by step 222, the module 61 updates the services document 150 which it publishes to remote peer devices as represented by step 224.

Step 226 represents determining whether any of the services available (as represented in the updated services cache 43) are useful for processing the business process data stored in the business process data cache 41. If yes, step 228 represents making a method call to the service. Step 230 represents returning to the event loop.

Upon detecting that a remote peer is capable of performing a service (based on physical attributes or spatial behavior as published by the remote peer), as represented by step 232, the module 61 may, as represented by steps 234, make a method call to the remote peer in conjunction with providing the remote peer with the methods and tasks needed for performing the service. Step 236 represents returning to the event loop.

After making a method call at either step 228 or step 234, the remote peer may return an applicable response. Step 238 represents receiving a response to a method call. Step 240 represents writing data included in the response to the business process data cache 41. Step 242 represents returning to the event loop.

Upon receiving a method call from a remote peer for a published service, as represented by step 242, the module 61 will pass the method call to the services processor as represented by step 246. Step 248 then represents passing the applicable response to the method call back to the remote peer and step 250 represents returning to the event loop.

Upon receiving a method call from a remote peer for a new service, as represented by step 252, the module 61 will write the methods and tasks provided by the remote peer to the method instructions 60 as represented by step 254.

Step 256 represents passing the method call to the services processor and step 258 represents passing the applicable response to the method call back to the remote peer. Step 260 represents returning to the event loop.

In summary, the teachings of the present invention provide an improved network services system that provides for delegating data processing tasks between peer device based not only on the web services provided by such devices, but based on the physical capabilities and the spatial behavior of such devices.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A peer device for performing a data processing service for a second peer device communicating with the peer device through a network interface, the peer device comprising:

a local instruction storage for storing instructions for performing each of a plurality of published data processing services which the peer device may perform for the second peer device; and a method processor, coupled to the network interface comprising:
  an interaction module for:
    publishing a description of each of the plurality of published data processing services which the peer device makes available to the second peer device; and
    receiving a method call from the second peer device through the network interface, the method call being a method call for a published data processing service or a new data processing service received in conjunction with instructions for performing the new data processing service; and
  a services module for performing the new data processing service by obtaining through the network interface instructions for performing the new data processing service from the second peer device;
  wherein:
  at least one of the published data processing services is a data processing service that can only be performed by the peer device when a remote service is available to the peer device;
  the description of such data processing service includes at least one of: i) an indication that the data processing service can be performed; and ii) an estimate of when the data processing service can be performed.

2. The peer device of claim 1, wherein:
the interaction module further:
stores the new data processing instructions in the local instruction storage as instructions for performing a published data processing service; and
publishes the new data processing service as a published data processing service that the peer device may perform in response to receiving a method call therefore.

3. The peer device of claim 2, wherein:
the interaction module further publishes a description of the physical attributes of the peer device; and
the new data processing service is a service which the peer device can perform based on the physical attributes of the peer device.

4. The peer device of claim 1, further comprising:
a spatial behavior module for recording spatial behavior of the peer device, the spatial behavior being at least one of: i) a record of the location of the peer device with respect to time; and ii) a record of remote services available to the peer device with respect to time; and
a heuristics module for estimating when a remote service will be available to the peer device based on comparison of at least one of the current time and the current location of the peer device and the spatial behavior of the peer device.

5. The peer device of claim 1, further comprising:
a spatial behavior module for recording spatial behavior of the peer device, the spatial behavior being at least one of: i) a record of the location of the peer device with respect to time; and ii) a record of remote services available to the peer device with respect to time; and
the interaction module further publishes the spatial behavior of the peer device and the new data processing service is a service which the peer device can perform based on the spatial behavior of the peer device.

6. The peer computing system of claim 1, wherein the services module is configured to perform both the new data processing service and a published data processing service.

7. A method performed by a peer device for performing a data processing service for a second peer device communicating to the peer device through a network interface, the method comprising:
publishing a description of each of a plurality of published data processing services which the peer device makes available to the second peer device through the network interface;
receiving a method call from the second peer device, the method call being a method call for a published data processing service or a new data processing service in conjunction with instructions for performing the new data processing service; and
performing the new data processing service by obtaining, through the network interface, instructions for performing the new data processing service from the second peer device;
wherein:
at least one of the published data processing services is a data processing service that can only be performed by the peer device when a remote service is available to the peer device;
the description of such data processing service includes at least one of: i) an indication that the data processing service can be performed; and ii) an estimate of when the data processing service can be performed.

8. The method of claim 7, further comprising:
storing the new data processing instructions in the local instruction storage as instructions for performing a published data processing service; and
publishing the new data processing service as a published data processing service that the peer device may perform in response to receiving a method call therefore.

9. The method of claim 8, further comprising
publishing a description of the physical attributes of the peer device and the new data processing service is a service which the peer device can perform based on the physical attributes of the peer device.

10. The method of claim 7, further comprising:
recording spatial behavior of the peer device, the spatial behavior being at least one of: i) a record of the location of the peer device with respect to time; and ii) a record of remote services available to the peer device with respect to time; and
estimating when a remote service will be available to the peer device based on a comparison of at least one of the current time and the current location of the peer device and the spatial behavior of the peer device.

11. The method of claim 7, further comprising:
recording spatial behavior of the peer device, the spatial behavior being at least one of: i) a record of the location of the peer device with respect to time; and ii) a record of remote services available to the peer device with respect to time; and
publishing the spatial behavior of the peer device and the new data processing service is a service which the peer device can perform based on the spatial behavior of the peer device.

* * * * *